Oct. 13, 1942.   H. W. BALZ ET AL   2,298,862
DYNAMO-ELECTRIC MACHINE CONSTRUCTION
Filed Aug. 12, 1941

Inventors:
Harry W. Balz,
Lawrence F. Hemphill,
by Harry E. Dunham
Their Attorney.

Patented Oct. 13, 1942

2,298,862

UNITED STATES PATENT OFFICE 2,298,862

DYNAMOELECTRIC MACHINE CONSTRUCTION

Harry W. Balz and Lawrence F. Hemphill, Fort Wayne, Ind., assignors to General Electric Company, a corporation of New York Application August 12, 1941, Serial No. 406,452

12 Claims. (Cl. 171—206)

Our invention relates to dynamo-electric machines and more particularly to an improved armature construction for this type machine.

An object of our invention is to provide an improved dynamo-electric machine rotatable member construction.

Another object of our invention is to provide an improved commutator lead construction for the rotatable member of a dynamo-electric machine.

Further objects and advantages of our invention will become apparent and our invention will be better understood from the folowing description referring to the accompanying drawing, and the features of novelty which characterize our invention will be pointed out with particularity in the claims annexed to and forming part of this specification.

Figure 1:
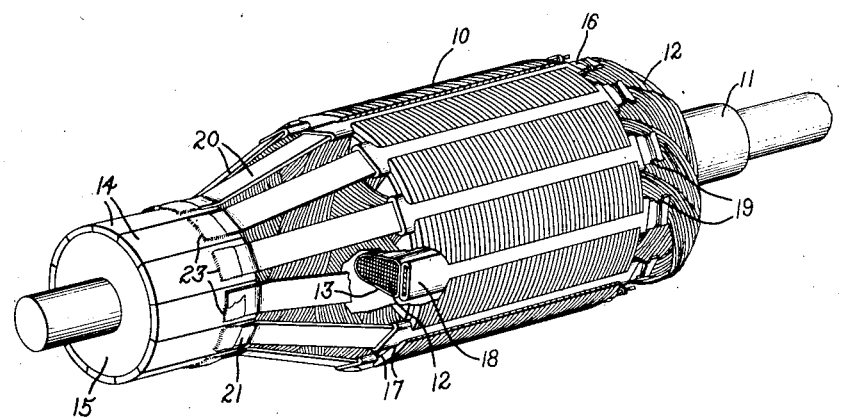
Figure 2:
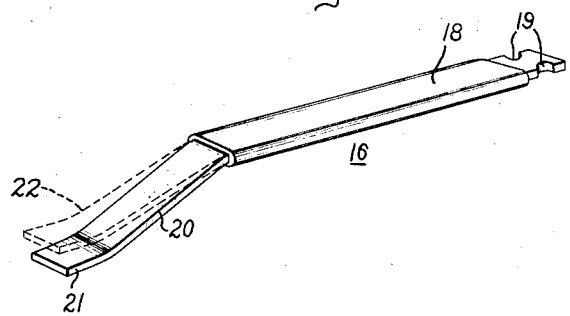

In the drawing, Fig. 1 is a perspective view, partly broken away, of the rotatable member of a dynamo-electric machine embodying our invention; and Fig. 2 is a perspective view showing an improved lead construction according to our invention.

Referring to the drawing, we have shown the rotatable member of a dynamo-electric machine including a laminated core 10 of magnetic material mounted upon a shaft 11 and provided with a winding 12 formed of electrical conductors arranged in winding slots 13 of the core 10. A commutator including a plurality of electrically conductive commutator bars 14 also is mounted on the shaft 11 and is insulated therefrom by insulating material 15. Each commutator bar is electrically connected to the winding 12 by a lead 16 formed of resilient electrically conductive material of relatively larger cross-section than the conductors forming the winding 12. These leads are relatively wide flat strips of material such as phosphor bronze, which are provided with a relatively straight portion adapted to extend through an enlarged portion 17 of the winding slots 13 above the winding 12 as slot wedges for retaining the winding in position in the armature core. Insulation 18 is arranged about this portion of the leads within the core slots, and the end of the lead which projects from the slot end away from the commutator is formed with a pair of notches 19 to which the winding 12 is electrically connected. The other end 20 of the lead 16 is bent angularly inwardly relative to the slot part of the lead 16, as shown in Fig. 2, for a distance greater than the distance between the outer surface of the commutator bars 14 and the enlarged portion 17 of the winding slots, such that when the leads are in position in the winding slots, the ends 21 thereof engage the commutator bars 14 and are biased outwardly by this contact so as to exert a biasing force radially inwardly on the commutator for providing a good electrical contact therewith. This arrangement also assists in overcoming centrifugal force which tends to throw the leads 20 out of contact with the commutator bars when the armature is rotated and enables the use of different size commutators with the same size lead and armature, as the end 20 of the lead is bent outwardly, as shown by the dotted lines 22 in Fig. 2. In order to insure a good electrical contact between the winding 12 and the commutator bars 14, the ends 21 of the leads are soldered to the bars 14 as shown at 23. This soldered connection may be obtained in any suitable manner, such as by dip soldering the commutator and the ends 21 of the leads 16. Thus, we have provided an improved dynamo-electric machine rotatable member having a commutator lead which resists the effects of centrifugal force, shaft bending and vibration, in tending to break the electrical connection between the lead and the commutator, is of sufficient size to prevent breakage of the lead connection between the commutator and the winding and assists in retaining the end turns of the winding in position, and is arranged as a slot wedge for retaining the armature winding in the winding slots of the armature core.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. A dynamo-electric machine rotatable member including a core having winding slots therein, conductors forming a winding in said slots, a commutator, means including a lead connected to said winding and being formed and arranged in contact with said commutator for exerting a biasing force radially inwardly on said commutator and for providing an electrical connection between said winding and said commutator, and insulation arranged about said lead in said slot.

2. A dynamo-electric machine rotatable member including a core having winding slots therein, conductors forming a winding in said slots, a commutator, and means including leads connected to said winding and being arranged in contact with said commutator for providing electrical connections between said winding and said commutator, said leads being arranged in said slots as slot wedges for retaining said winding in position in said slots.

3. A dynamo-electric machine rotatable member including a core having winding slots therein, conductors forming a winding in said slots, a commutator, and means including leads connected to said winding externally of said slots for providing electrical connections between said winding and said commutator, said leads being arranged in said slots as slot wedges for retaining said winding in position in said slots.

4. A dynamo-electric machine rotatable member including a core having winding slots therein, conductors forming a winding in said slots, a commutator, and means including leads connected to said winding and being arranged in contact with said commutator for providing electrical connections between said winding and said commutator, said leads being relatively wide and substantially continuous longitudinally through said slots and arranged therein as slot wedges for retaining said winding in position in said slots.

5. A dynamo-electric machine rotatable member including a core having winding slots therein, conductors forming a winding in said slots, a commutator, means including leads connected to said winding and being arranged in contact with said commutator and formed to exert a biasing force radially inwardly on said commutator for providing electrical connections between said winding and said commutator, said leads being arranged in said slots as slot wedges for retaining said winding in position in said slots, and insulation arranged about said leads in said slots.

6. A dynamo-electric machine rotatable member including a core having winding slots therein, conductors forming a winding in said slots, a commutator, means including leads extending through said slots as wedges above said winding and being connected to said winding at the end thereof away from said commutator and being arranged in contact with said commutator for providing electrical connections between said winding and said commutator, said leads being formed and arranged to exert a biasing force radially inwardly on said commutator, and insulation arranged about said leads in said slots.

7. A dynamo-electric machine rotatable member including a core having winding slots therein, conductors forming a winding in said slots, a commutator, means including leads extending through said slots as wedges above said winding and being connected to said winding at the end thereof away from said commutator and being arranged in contact wtih said commutator for providing electrical connections between said winding and said commutator, said leads being relatively larger than said winding conductors and being formed and arranged to exert a biasing force radially inwardly on said commutator, and insulation arranged about said leads in said slots.

8. A lead for a dynamo-electric machine rotatable member with a commutator and a core of magnetic material having winding slots therein and winding conductors in the slots, comprising a resilient member of electrically conductive material adapted to extend through the slots above the machine winding for retaining the winding in position, said lead being adapted to be electrically connected to the winding at the end of the rotatable member away from the commutator and being formed to exert a biasing force radially inwardly on the commutator when arranged in the winding slots for providing an electrical connection with the commutator.

9. A lead for a dynamo-electric machine rotatable member with a commutator and a core of magnetic material having winding slots therein and winding conductors in the slots, comprising a resilient member of electrically conductive material adapted to extend through the slots above the machine winding for retaining the winding in position, said lead being adapted to be electrically connected to the winding at the end of the rotatable member away from the commutator and being formed and arranged to exert a biasing force radially inwardly on the commutator for providing an electrical connection therewith, and insulation about said lead for the part thereof adapted to extend through the slots in the core.

10. A lead for a dynamo-electric machine rotatable member with a commutator and a core of magnetic material having winding slots therein and winding conductors in the slots, comprising a resilient member of electrically conductive material adapted to extend through the slots above the machine winding, said lead being adapted to be electrically connected to the winding at the end of the rotatable member away from the commutator and having an end thereof bent angularly inwardly relative to a part thereof adapted to extend in the winding slots and adapted to be biased outwardly by contact with the commutator for exerting a biasing force radially inwardly on the commutator for providing an electrical connection therewith.

11. A lead for a dynamo-electric machine rotatable member with a commutator and a core of magnetic material having winding slots therein and winding conductors in the slots, comprising a resilient member of electrically conductive material adapted to extend through the slots above the machine winding for retaining the winding in position, said lead being relatively larger than the winding conductors and adapted to be electrically connected thereto at the end of the rotatable member away from the commutator, said lead being formed and arranged to exert a biasing force radially inwardly on the commutator for providing an electrical connection therewith, and insulation about said lead in the part thereof adapted to extend through the slots in the core.

12. A lead for a dynamo-electric machine rotatable member with a commutator and a core of magnetic material having winding slots therein and winding conductors in the slots, comprising a resilient member of electrically conductive material relatively larger than the winding conductors and being adapted to extend through the slots above the winding for retaining the winding in position, said lead having notches in an end thereof adapted to be electrically connected to the winding at the end of the rotatable member away from the commutator and having an end thereof bent angularly inwardly relative to a part thereof adapted to extend in the winding slots and being adapted to be biased outwardly by contact with the commutator for exerting a biasing force radially inwardly on the commutator, and insulating material about said lead for the part thereof adapted to extend through the slots in the core.

HARRY W. BALZ.
LAWRENCE F. HEMPHILL.